May 18, 1948.   R. V. BESHGETOOR   2,441,747
METHOD OF MAKING MATRICES FOR FRESNEL-TYPE LENSES
Filed March 29, 1946

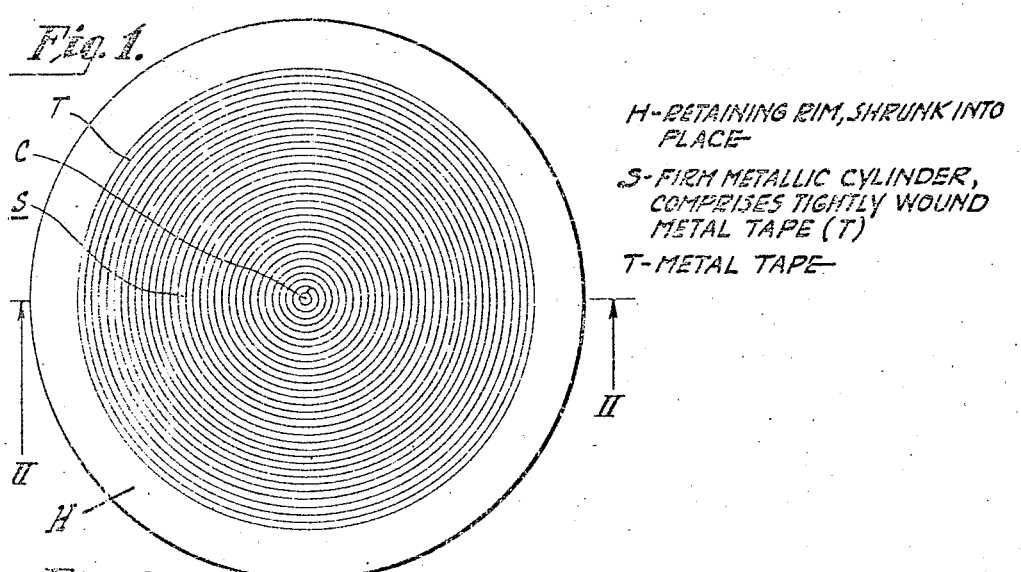

Fig. 1.
H — RETAINING RIM, SHRUNK INTO PLACE
S — FIRM METALLIC CYLINDER, COMPRISES TIGHTLY WOUND METAL TAPE (T)
T — METAL TAPE

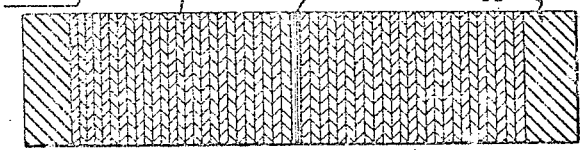

Fig. 2.

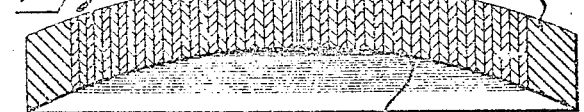

Fig. 3.
A ) SPHERICAL SURFACES,
B ) GROUND AND POLISHED

Fig. 4.
A' ) FRESNEL SURFACES FORMED
B' ) BY FLATTENING THE SPHERICALLY GROUND BLANK OF FIG. 3.

Fig. 5.
ELECTROPLATED NEGATIVE — REPLICA OF FRESNEL SURFACE

Fig. 6.
POSITIVE REPLICA WITH BACKING PLATE

INVENTOR.
Ray V. Beshgetoor
BY
ATTORNEY

UNITED STATES PATENT OFFICE 2,441,747

METHOD OF MAKING MATRICES FOR FRESNEL-TYPE LENSES

Ray V. Beshgetoor, Merchantville, N. J., assignor to Radio Corporation of America, a corporation of Delaware Application March 29, 1946, Serial No. 658,351

3 Claims. (Cl. 76—107)

My present invention relates to improvements in the art of making matrices and molds for the manufacture of Fresnel-type lenses.

In conventional Fresnel lenses, such as the ones used in railway and marine signaling systems, the lens surface contains relative few ribs or rings. However, the Fresnel-type lens commonly incorporated in plastic viewing screens for the purpose of eliminating "hot spots" in television, motion picture and micro-film projection systems may contain up to say, forty ribs per inch. (As to this, see by way of example, copending application Ser. No. 583,356 to Russell R. Law).

In making Fresnel-type viewing screens it is usually more convenient to make the ribs of the lens in the form of a continuous spiral instead of a series of concentric circles. This has heretofore been done with a machine of the type employed in cutting a spiral sound track in a phonograph disc. In adapting such a machine to the cutting of a spiral groove in a viewing screen (or in a matrix for such a screen) it is of course necessary to provide some means for continuously changing the angle of the blade as the lead-screw of the machine moves the cutting head in a radial direction. Numerous difficulties are encountered in cutting a metal matrix for a spiral Fresnel lens with such a machine. By way of example: the cutting tool may be worn away in making the long continuous cut and it is therefore practically impossible to ensure sharp corners at the apex of each rib and at the bottom of each groove. Furthermore, it is difficult to generate true spherical surfaces on the optically refracting surfaces. It is also extremely difficult to hold the said surfaces to the correct angle with respect to the perpendicular, since, as previously pointed out, the angle changes continuously with each groove and each part of every groove. The polishing of a grooved optical surface also presents serious difficulties.

Accordingly, the principal object of my invention is to obviate the foregoing and other less apparent objections to present day methods and means for making matrices for spiral Fresnel-type lenses.

Another and related object of my invention is to provide an improved master matrix or mold for the manufacture of spiral Fresnel-type lenses, and one characterized by the true angular accuracy and sharpness of its lands and grooves, by its high optical finish and by the simplicity and economy of its construction.

My invention will be described in connection with the accompanying drawing, wherein: Fig. 1 is a top plan view of a spirally wound metal blank from which the master matrix of my invention is made and Figs. 2 to 6 inclusive are cross sectional views taken on line II—II of Fig. 1 of the blank at various stages of its conversion into a matrix for molding a spiral Fresnel-type lens.

In carrying my invention into effect I start with a tape T made of hardened steel or stainless steel, nickel, or other suitable material, of uniform thickness and width and wind it up tightly, beginning with the smallest possible center. I may employ a solid center or core C to facilitate the winding operation and, if the diameter of the core is small, it will not affect the performance of the ultimate Fresnel lens surface. The thickness of the tape determines the number of grooves and ridges per inch in the finished mold. Thus, for forty grooves per inch, the tape should be $\frac{1}{40}$ of an inch thick (0.025"). It is entirely practical to use tape as thin as one one-thousandths (0.001) of an inch.

If the tape is wound very tightly and clamped tight enough no cement is needed but, in the interest of rigidity, I may cement all or some of the turns during the winding with a very thin film of thermoplastic cement. I prefer to heat the tape and wind it while it is hot so that it will shrink upon cooling and will also set the thermoplastic cement. As shown in Figs. 1 and 2 I wind the tape edgewise in the form of a flat spiral S and, when the desired diameter is attained I clamp it in a suitable clamp or holder, H. This holder may comprise simply a solid metal ring applied while hot and then cooled to give it a shrink fit. In this condition the wound up tape is well secured and can be machined as though it comprised a solid metal plate.

Referring to Fig. 3, as the next step in making the mold I cut or grind the plane faces of the plate into spherical surfaces A and B, one concave and the other convex, of the same radius of curvature, or of different radii, if the surface of the mold is to be concave or convex instead of flat. I may plate these spherical surfaces with chromium or other hard metal and polish them in order to provide them with an optical finish. When the desired optical surface or surfaces are attained I remove the clamping ring H or, preferably merely loosen it slightly, by heat. If the turns of the spiral are bonded with thermoplastic cement I also heat the blank to plasticize the cement and then press it, concave side down, against a platen (not shown) of any desired different radius (including an infinite radius) of curvature. In collapsing the plate S, I prefer to use a hydraulic press and I employ sufficient force to cause the adjacent faces of the convolutions of the metal ribbon to slip on each other in an axial direction until the edge of each turn is in contact with the flat (or curved) platen of the press. The exposed optical Fresnel surface or surfaces A', B' should be protected from actual contact with the platen and ram of the press as by means of a thin cushion or pad (not shown) similar to the soft paper fibre sheets used in "backing up" phonograph record pressing matrices. I maintain the axial compression force on the mold or matrix while permitting it to cool. This causes the clamping ring to shrink, hardens the thermoplastic cement and binds each turn of the ribbon firmly in its new position.

It will be apparent that in "flattening" the concave-convex spirally wound blank of Fig. 3, the convolutions of the ribbon are converted into spirally ribbed surfaces A', B'. That is to say, the now exposed convolutions of the ribbon have a protruding beveled edge which comprises the lens-forming surface of the matrix. The angle of bevel of these ribbed surfaces varies in proportion to its radial distance from the center of the spiral.

The master matrix (Fig. 4) can be used directly for molding or embossing purposes or, as indicated in Fig. 5, I may electroplate it and make one or more negative replicas from which any desired number of positive solid metal molds or "stampers" (Fig. 6) may be made by the usual method employed in the phonograph record industry. The shape of the master matrix is round, but it may be cut or trimmed to a rectangular, square or other shape, as may also the positive replicas or "stampers." This trimming operation facilitates the molding or embossing operation necessary in the manufacture of plastic viewing screens since it saves material and eliminates extra finishing operations.

It will now be apparent that my invention provides a novel method of making a matrix for the manufacture of a spiral Fresnel type lens, and provides an improved matrix of any desired number of accurately and sharply cut ribs per inch.

I claim as my invention:

1. A method of making a matrix for the manufacture of a spiral Fresnel-type lens, said method comprising, heating a metal ribbon, winding said heated metal ribbon in the form of a tight spiral having a central axis and a pair of major faces consisting of the oppositely located edges of said ribbon, permitting said ribbon to cool whereby to further tighten the convolutions of said spiral by shrinking the metal of which said ribbon is comprised, cutting at least one of the major surfaces of said tightened spirally-wound ribbon in the form of a spherical surface, moving the adjacent faces of the convolutions of said ribbon axially with respect to one another to connect said surface into a surface of a different radius of curvature, whereby said last mentioned surface comprises a continuous tight spiral rib having an exposed beveled edge which is inclined different degrees with respect to said axis.

2. The invention as set forth in claim 1 and including the step of providing the faces of said metal ribbon with a thermoplastic coating to cause the adjacent faces of the convolutions of said spirally wound ribbon to adhere to each other upon cooling.

3. The method, in accordance with claim 1, of making a matrix of non-circular contour which comprises making a thin metal replica of said beveled-edge surface and cutting said metal replica into the desired shape.

RAY V. BESHGETOOR.

REFERENCES CITED

The following references are of record in the file of this patent:

UNITED STATES PATENTS

| Number | Name | Date |
|---|---|---|
| 1,898,251 | Kopp | Feb. 21, 1933 |
| 2,129,697 | Louisot | Sept. 13, 1938 |
| 2,224,337 | Bostwick | Dec. 10, 1940 |
| 2,404,448 | Martin | July 23, 1946 |

FOREIGN PATENTS

| Number | Country | Date |
|---|---|---|
| 213,944 | Switzerland | June 16, 1941 |